United States Patent
Park et al.

(10) Patent No.: US 11,507,227 B2
(45) Date of Patent: Nov. 22, 2022

(54) TOUCH DISPLAY DEVICE WITH COMPENSATION OF COMMON VOLTAGE

(71) Applicant: LG Display Co., Ltd., Seoul (KR)

(72) Inventors: Kyoung-Seok Park, Paju-si (KR); Ki-Jeong Lee, Paju-si (KR); Hyun-Ho Park, Paju-si (KR); Sung-Jin Um, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/494,568

(22) Filed: Oct. 5, 2021

(65) Prior Publication Data

US 2022/0206627 A1  Jun. 30, 2022

(30) Foreign Application Priority Data

Dec. 30, 2020  (KR) ................. 10-2020-0186956

(51) Int. Cl.
*G06F 3/041* (2006.01)
*G06F 3/044* (2006.01)

(52) U.S. Cl.
CPC .......... *G06F 3/0418* (2013.01); *G06F 3/0412* (2013.01); *G06F 3/0443* (2019.05); *G06F 3/04164* (2019.05)

(58) Field of Classification Search
CPC .. G06F 3/0418; G06F 3/0412; G06F 3/04164; G06F 3/0443
See application file for complete search history.

(56) References Cited

U.S. PATENT DOCUMENTS

| 9,223,425 | B1* | 12/2015 | Kim | ..................... G06F 3/0443 |
| 9,600,130 | B2 | 3/2017 | Kim et al. | |
| 10,261,625 | B2 | 4/2019 | Cho et al. | |
| 2009/0115737 | A1* | 5/2009 | Toyoshima | ............. G06F 3/044 345/173 |
| 2013/0328757 | A1* | 12/2013 | Matsumoto | ....... G02F 1/134336 345/87 |
| 2017/0242529 | A1* | 8/2017 | Park | ......................... G09G 3/20 |
| 2019/0065000 | A1* | 2/2019 | Kim | ..................... G06F 3/04184 |
| 2019/0346960 | A1* | 11/2019 | Liang | .................. G09G 3/3696 |
| 2020/0033977 | A1* | 1/2020 | Zhao | ..................... G06F 3/04164 |
| 2021/0373732 | A1* | 12/2021 | Tian | ..................... G06F 3/04166 |

FOREIGN PATENT DOCUMENTS

| KR | 10-2016-0088528 A | 7/2016 |
| KR | 10-2017-0080863 A | 7/2017 |

\* cited by examiner

*Primary Examiner* — Liliana Cerullo
(74) *Attorney, Agent, or Firm* — Seed IP Law Group LLP

(57) ABSTRACT

A touch display device and a method of driving the same are disclosed. The touch display device includes: a touch display panel displaying an image and sensing a touch; a plurality of touch electrodes disposed on the touch display panel and divided into a plurality of blocks; a plurality of gate lines disposed on the touch display panel and overlapping the plurality of touch electrodes; and a touch display driving circuit supplying a common voltage to the plurality of touch electrodes and supplying a gate voltage to the plurality of gate lines, wherein the common voltage has a first voltage before and after a first compensation period corresponding to a high level period of the gate voltage supplied to one of the plurality of gate lines firstly overlapping one of the plurality of touch electrodes and has a second voltage lower than the first voltage during the first compensation period.

13 Claims, 7 Drawing Sheets ial Field

The present disclosure relates to a touch display device, and more particularly, to a touch display device where a ripple of a common voltage is compensated by modulating a common voltage to have different values in synchronization with gate voltages of gate lines overlapping rising and falling portions of a touch electrode and a method of driving the touch display device.

Description of the Related Art

As the information age progresses, display devices have rapidly advanced. A liquid crystal display (LCD) device, an organic light emitting diode (OLED) display device and a field emission display (FED) device have been developed and widely used as a flat panel display (FPD) having a thin profile, a light weight and a low power consumption. A conventional cathode ray tube (CRT) has been rapidly replaced by the FPD.

Recently, a touch display device referred to as a touch screen where a touch panel is disposed on a display panel has been widely used.

The touch display device is used as an output device displaying an image and as an input device receiving an order of a user by a touch on a portion of the image. The touch panel of the touch display device may be classified into a resistance type, a capacitance type, an infrared type and a surface acoustic wave type according to a method of detecting a position information.

When the user watches the image of the display panel and touches the touch panel, the touch panel detects a position information of the touched portion and recognizes an order of the user by comparing the detected position information with a position information of the image.

In the touch display device, the touch panel may be attached to the display panel or the touch panel may be integrated on a substrate of the display panel as an in-cell type.

The capacitance type touch display device may be classified into a self-capacitance type and a mutual capacitance type. In a self-capacitance type touch display device, a common electrode used for an image display is divided into a plurality of blocks, and the common electrode of each block is used as a touch electrode for a touch sensing.

BRIEF SUMMARY

The inventors of the present disclosure have recognized that since the common electrode is formed in a divided area instead of a whole area, a ripple that a common voltage of the common electrode wavers due to a coupling with a gate voltage of a gate line overlapping the common electrode occurs. Specifically, the gate voltage is sequentially applied to a plurality of gate lines overlapping the common electrode of each block. In a central portion of the common electrode, both a falling edge of the corresponding gate voltage and a rising edge of the corresponding gate voltage occur. Only the rising edge of the corresponding gate voltage occurs in an upper portion of the common electrode and only the falling edge of the corresponding gate voltage occurs in a lower portion of the common electrode. As a result, a difference of the ripple of the upper, central and lower portions of the common electrode occurs and a difference of an average of the common electrode occurs to cause deterioration such as a bright line.

Accordingly, one or more embodiments of the present disclosure are directed to a touch display device and a method of driving the touch display device that substantially obviate one or more of the problems due to limitations and disadvantages of the related art as well as the technical problems identified above by the inventors.

One or more embodiments of the present disclosure provide a touch display device where a ripple of a common voltage is compensated and deterioration such as a bright line is reduced or prevented by modulating a common voltage to have different values in synchronization with gate voltages of gate lines overlapping rising and falling portions of a touch electrode and a method of driving the touch display device.

One or more embodiments of the present disclosure provide a touch display device where an average of a common voltage is kept constant and a display quality is improved by decreasing a common voltage during a high level period of a gate voltage of a gate line firstly overlapping a touch electrode and by increasing a common voltage during a period delayed by one horizontal period as compared with a high level period of a gate voltage of a gate line lastly overlapping a touch electrode and a method of driving the touch display device.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the purpose of the present disclosure, as embodied and broadly described herein, a touch display device includes: a touch display panel displaying an image and sensing a touch; a plurality of touch electrodes disposed on the touch display panel and divided into a plurality of blocks; a plurality of gate lines disposed on the touch display panel and overlapping the plurality of touch electrodes; and a touch display driving part supplying a common voltage to the plurality of touch electrodes and supplying a gate voltage to the plurality of gate lines, wherein the common voltage has a first voltage before and after a first compensation period corresponding to a high level period of the gate voltage supplied to one of the plurality of gate lines firstly overlapping one of the plurality of touch electrodes and has a second voltage lower than the first voltage during the first compensation period.

In another aspect, a method of driving a touch display device includes: supplying a common voltage to a plurality of touch electrodes of a touch display device; supplying a gate voltage to a plurality of gate lines of the touch display device; and displaying an image in a touch display panel of the touch display device using the common voltage and the gate voltage, wherein supplying the common voltage comprises: supplying a first voltage as the common voltage before and after a first compensation period corresponding to a high level period of the gate voltage supplied to one of the plurality of gate lines firstly overlapping one of the plurality of touch electrodes; and supplying a second voltage lower than the first voltage as the common voltage during the first compensation period.

It is to be understood that both the foregoing general description and the following detailed description are explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
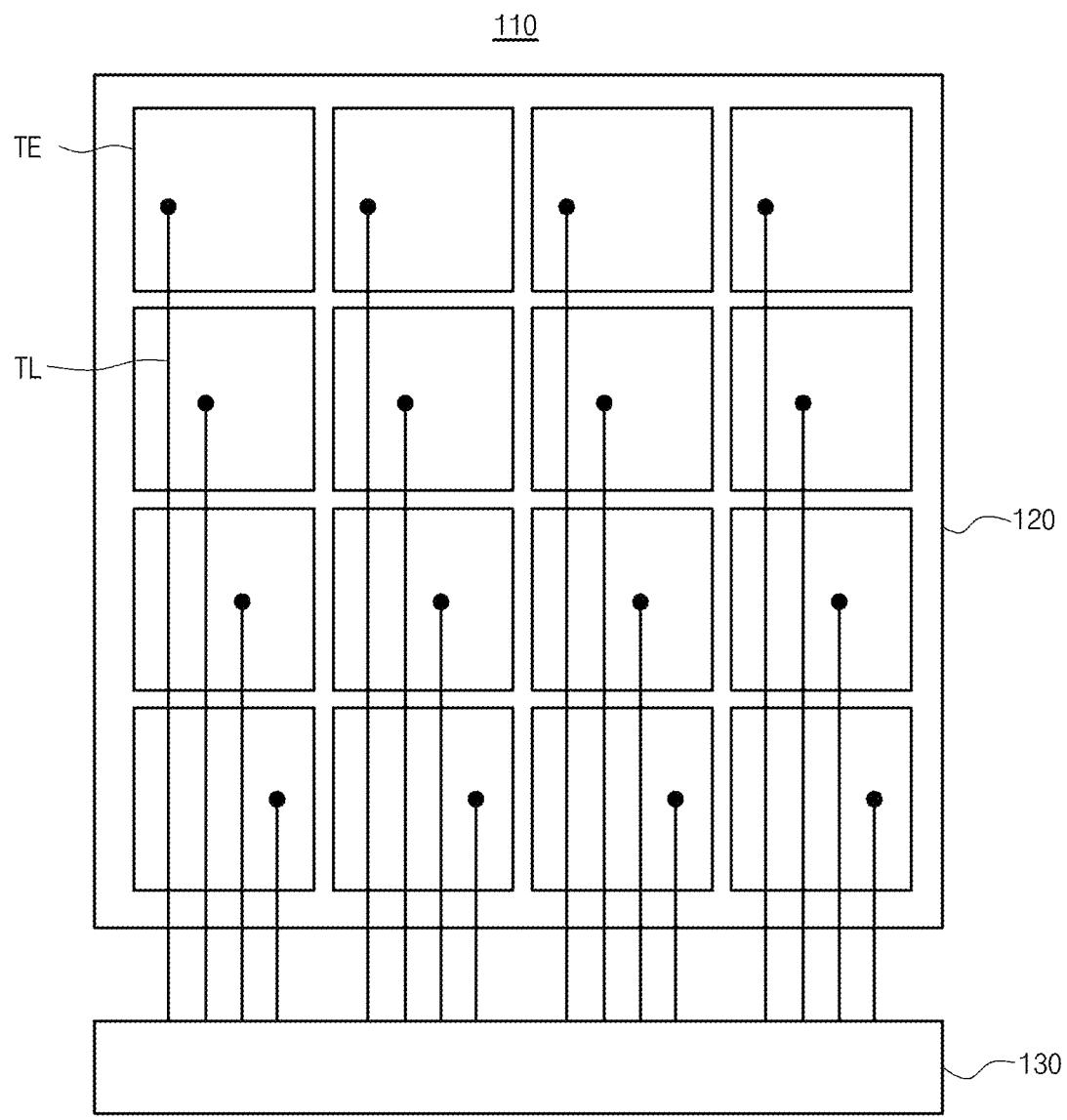
FIG. 1 is a view showing a touch display device according to an embodiment of the present disclosure.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments are provided so that this disclosure may be sufficiently thorough and complete to assist those skilled in the art to fully understand the scope of the present disclosure.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. In a case where terms "comprise," "have," and "include" described in the present specification are used, another part may be added unless a more limiting term, such as "only," is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)," is used.

It will be understood that, although the terms "first," "second," etc., may be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "part" may include any electrical circuitry, features, components, an assembly of electronic components or the like. That is, "part" may include any processor-based or microprocessor-based system including systems using microcontrollers, integrated circuit, chip, microchip, reduced instruction set computers (RISC), application specific integrated circuits (ASICs), field-programmable gate arrays (FPGAs), graphical processing units (GPUs), logic circuits, and any other circuit or processor capable of executing the various operations and functions described herein. The above examples are examples only, and are thus not intended to limit in any way the definition or meaning of the term "part." In some embodiments, the various parts described herein may be included in or otherwise implemented by processing circuitry such as a microprocessor, microcontroller, or the like.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Hereinafter, a touch display device and a method of driving the touch display device according to embodiments of the present disclosure will be described in detail with reference to the accompanying drawings. In the following description, like reference numerals designate like elements throughout. When a detailed description of well-known functions or configurations related to this document is determined to unnecessarily cloud a gist of the inventive concept, the detailed description thereof will be omitted or will be made brief.

FIG. 1 is a view showing a touch display device according to an embodiment of the present disclosure. For example, the touch display device according to an embodiment of the present disclosure may be of a self-capacitance in-cell type.

In FIG. 1, a touch display device 110 according to an embodiment of the present disclosure includes a touch display panel 120 and a touch display driving part 130.

The touch display panel 120 displays an image and senses a touch. For a touch sensing, the touch display panel 120 includes a plurality of touch electrodes TE divided into a plurality of blocks and a plurality of touch lines TL connecting the plurality of touch electrodes TE and the touch display driving part 130, respectively.

For example, the plurality of touch electrodes TE may be disposed in a matrix shape.

Although not shown, for an image display, the touch display panel 120 may include a first substrate, a plurality of gate lines, a plurality of data lines, a plurality of thin film transistors (TFTs) and a plurality of pixel electrodes. The gate lines and the data lines are disposed on the first substrate and cross each other to define a plurality of pixel regions. Each TFT is disposed in a respective pixel region and connected to a respective gate line and data line. Each pixel electrode is disposed in a respective pixel region and is connected to the respective TFT.

The touch display panel 120 may be an organic light emitting diode (OLED) panel or a liquid crystal panel. The touch display panel 120 of an OLED panel may further include a plurality of light emitting diodes, each light emitting diode connected to a respective pixel electrode and a passivation layer covering (or at least partially covering) the light emitting diode. The touch display panel 120 of a liquid crystal panel may further include a second substrate facing the first substrate, a common electrode under the second substrate and a liquid crystal layer between the first and second substrates.

When the touch display panel 120 is an OLED panel, a second electrode of a light emitting diode may be used as a touch electrode TE. When the touch display panel 120 is a liquid crystal panel, the common electrode may be used as a touch electrode TE.

The touch display driving part 130 supplies signals for an image display and a touch sensing to the touch display panel 120.

For example, the touch display driving part 130 supplies gate voltages and data voltages to the gate lines and the data lines, respectively, of the touch display panel 120 and supplies a common voltage to the touch electrodes TE through a plurality of touch lines TL of the touch display panel 120 during a display period for displaying an image.

As a result, the touch display device 110 displays an image using the gate voltages and the data voltages.

In addition, the touch display driving part 130 supplies a touch voltage to a touch electrode TE through a respective touch line TL of the touch display panel 120 during a touch period for sensing a touch.

As a result, the touch display device 110 senses a touch by analyzing a change of the touch voltage.

The touch electrode TE of a block overlapping a plurality of gate lines will be illustrated herein below with reference to the drawings.

Figure 2:
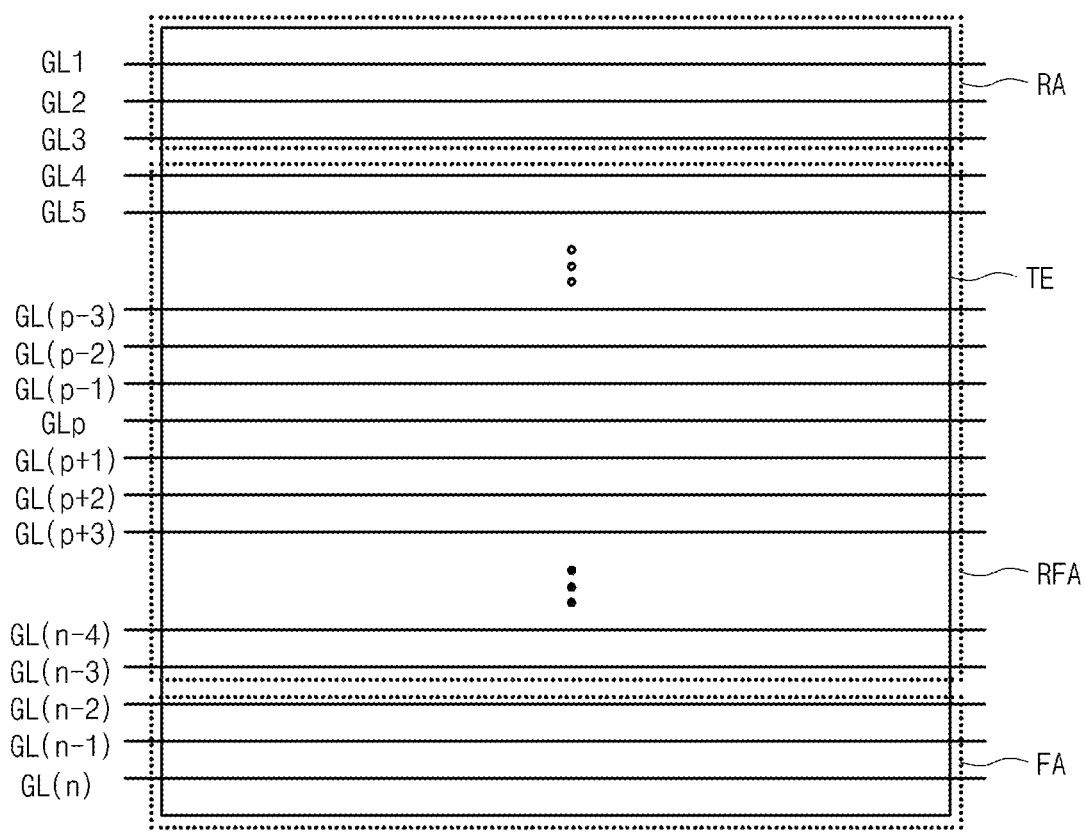
FIG. 2 is a view showing gate lines and a touch electrode of a touch display device according to an embodiment of the present disclosure.

FIG. 2 is a view showing gate lines and a touch electrode of a touch display device according to an embodiment of the present disclosure.

In FIG. 2, the touch electrode TE of a block of the touch display panel 120 overlaps first to nth gate lines GL1 to GL(n). The first gate line GL1 may be referred to as a gate line firstly overlapping the touch electrode TE, and the nth gate line GL(n) may be referred to as a gate line lastly overlapping the touch electrode TE.

The touch electrode TE may include a rising portion RA overlapping the first to third gate lines GL1 to GL3 where only a rising edge of the gate voltage occurs, a rising-falling portion RFA overlapping the fourth to (n−3)th gate lines GL4 to GL(n−3) where both a rising edge and a falling edge of the gate voltage occur, and a falling portion FA overlapping the (n−2)th to (n)th gate lines GL(n−2) to GL(n) where only a falling edge of the gate voltage occurs.

In a display period for an image display of the touch display device 110 of an embodiment of the present disclosure, the common voltage having a relatively low voltage value is supplied while the gate voltage is applied to the first to third gate lines GL1 to GL3 of the rising portion RA, and the common voltage having a relatively high voltage value is supplied while the gate voltage is applied to the (n−2)th to (n)th gate lines GL(n−2) to GL(n). As a result, a ripple of the common voltage is reduced or minimized and deterioration such as a bright line is reduced or prevented.

The gate voltage and the common voltage in the rising portion RA, the rising-falling portion RFA and the falling portion FA will be illustrated herein below with reference to drawings.

Figure 3A:
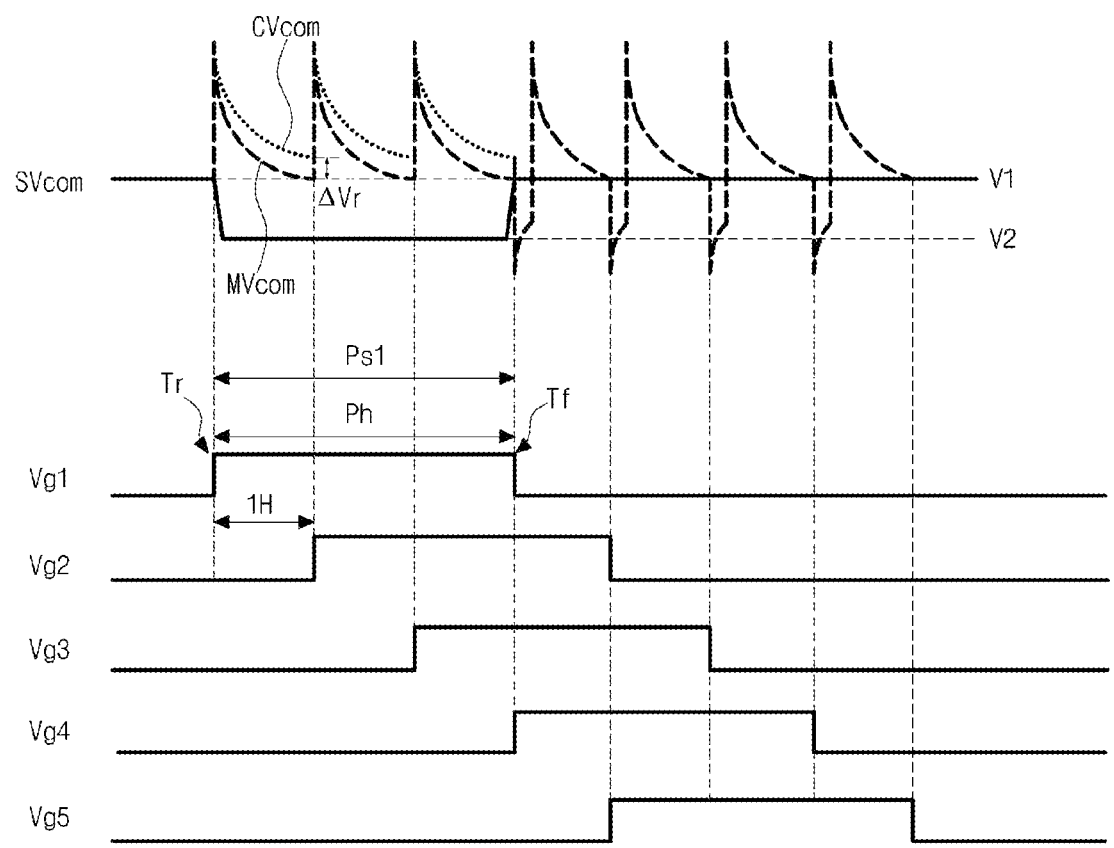
FIG. 3A is a view showing gate voltages and common voltages in a rising portion of a touch display device according to an embodiment of the present disclosure.
Figure 3B:
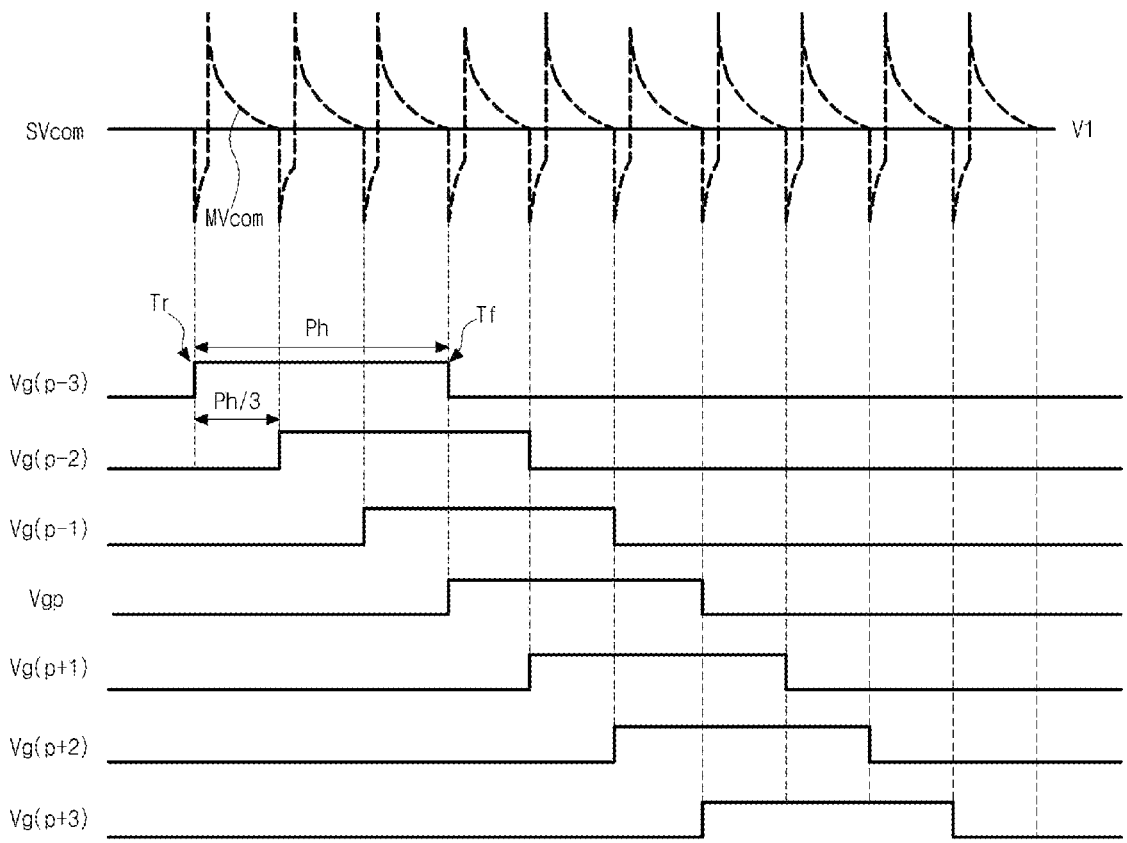
FIG. 3B is a view showing a rising-falling portion of a touch display device according to an embodiment of the present disclosure.
Figure 3C:
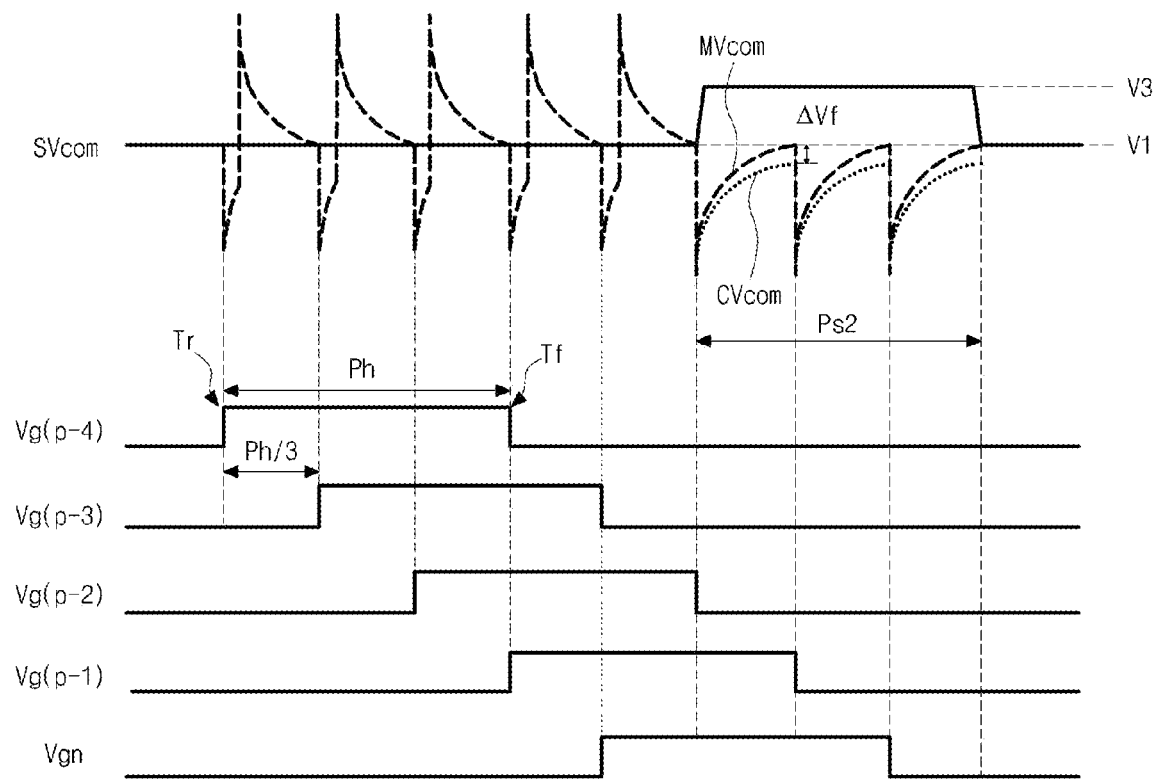
FIG. 3C is a view showing a falling portion of a touch display device according to an embodiment of the present disclosure.

FIGS. 3A, 3B and 3C are views showing gate voltages and common voltages in a rising portion, a rising-falling portion and a falling portion, respectively, of a touch display device according to an embodiment of the present disclosure.

In FIGS. 3A, 3B and 3C, first to nth gate voltages Vg1 to Vgn are applied to the first to (n)th gate lines GL1 to GL(n), respectively, overlapping the touch electrode TE of the touch display device 110 according to an embodiment of the present disclosure. Each of the first to nth gate voltages Vg1 to Vgn has a high level period Ph of a high level voltage.

The high level period Ph has a width corresponding to three times (three horizontal period: 3H) of one horizontal period (1H) which is a time for applying the data voltage to the pixel region corresponding to one gate line of the touch display panel 120. The high level periods Ph of the first to nth gate voltages Vg1 to Vgn move by one horizontal period (1H). For example, the high level period Ph of Vg2 is shifted by one horizontal period (1H) with respect to the high level period Ph of Vg1, the high level period Ph of Vg3 is shifted by one horizontal period (1H) with respect to the high level period Ph of Vg2, etc.

The high level periods Ph of the first to nth gate voltages Vg1 to Vgn are sequentially applied to the first to (n)th gate lines GL1 to GL(n). In this context, the reference to the first gate line GL1 as "gate line firstly overlapping the touch electrode TE" and the reference to the nth gate line GL(n) as "gate line lastly overlapping the touch electrode TE" may, for example, be understood as meaning that the high level period Ph of the first gate voltage Vg1 occurs first while the high level period Ph of the (n)th gate voltage Vgn occurs last among the high level periods Ph of the first to (n)th gate voltages Vg1 to Vgn.

As shown in FIG. 3A, in the rising portion RA of the touch electrode TE of the touch display device 110, a rising edge Tr of the first to third gate voltages Vg1 to Vg3 of the first to third gate lines GL1 to GL3 does not overlap a rising edge Tr and a falling edge Tf of the fourth to (n)th gate voltages Vg4 to Vgn of the fourth to (n)th gate lines GL4 to GL(n).

As a result, in the rising portion RA of the touch electrode TE of the touch display device 110, the common voltage applied to the touch electrode TE during the display period has only a rising ripple component due to a coupling caused by the rising edge Tr of the first to third gate voltages Vg1 to Vg3 of the first to third gate lines GL1 to GL3.

When a supply common voltage SVcom of a first voltage V1 is supplied to the touch electrode TE during a first compensation period Ps1 of a high level period Ph of the first gate voltage Vg1 corresponding to the rising edge Tr of the first to third gate voltages Vg1 to Vg3, a comparison common voltage CVcom of a real voltage of the touch electrode TE has only a rising ripple component due to a coupling caused by the rising edge Tr of the first to third gate voltages Vg1 to Vg3. As a result, the comparison common voltage CVcom is not stabilized to the first voltage V1 of the supply common voltage SVcom but assumes a voltage value greater than the first voltage V1 by a rising deviation ΔVr during one horizontal period (1H). Accordingly, deterioration such as a bright line may occur.

In the touch display device 110 according to an embodiment of the present disclosure, the supply common voltage SVcom of a second voltage V2 lower than the first voltage V1 (V2<V1) is supplied to the touch electrode TE during a first compensation period Ps1 of a high level period Ph of the first gate voltage Vg1 corresponding to the rising edge Tr of the first to third gate voltages Vg1 to Vg3. As a result, the measured common voltage MVcom of a real voltage of the touch electrode TE is stabilized to the first voltage V1 of the supply common voltage SVcom during one horizontal period (1H) in spite of a rising ripple component due to a coupling of the rising edge Tr of the first to third gate voltages Vg1 to Vg3. Accordingly, deterioration such as a bright line is reduced or prevented.

Here, the second voltage V2 may be a value corresponding to about 60% of a rising peak average of a rising ripple component. For example, the rising peak average may be about 35 mV, and the second voltage V2 may be a value (V1−21 mV) obtained by subtracting about 21 mV from the first voltage V1. The rising peak average may decrease to about 17 mV (e.g., reduction of ripple by about 48%).

As shown in FIG. 3B, in the rising-falling portion RFA of the touch electrode TE of the touch display device 110, a rising edge Tr of the fourth to (n−3)th gate voltages Vg4 to Vg(n−3) of the fourth to (n−3)th gate lines GL4 to GL(n−3) overlaps a falling edge Tf of one of the first to (n)th gate voltages Vg1 to Vgn, and a falling edge Tf of the fourth to (n−3)th gate voltages Vg4 to Vg(n−3) of the fourth to (n−3)th gate lines GL4 to GL(n−3) overlaps a rising edge Tr of another of the first to (n)th gate voltages Vg1 to Vgn.

For example, the rising edge Tr of a (p)th gate voltage Vgp among the fourth to (n−3)th gate voltages Vg4 to Vg(n−3) overlaps the falling edge Tf of a (p−3)th gate voltage Vg(p−3), and the falling edge Tf of the (p)th gate voltage Vgp overlaps the rising edge Tr of a (p+3)th gate voltage Vg(p+3).

As a result, in the rising-falling portion RFA of the touch electrode TE of the touch display device 110, the common voltage applied to the touch electrode TE during the display period has both of a rising ripple component and a falling ripple component due to a coupling caused by the rising edge Tr of one of the first to (n)th gate voltages Vg1 to Vgn of the first to (n)th gate lines GL1 to GL(n) and the falling edge Tf of another of the first to (n)th gate voltages Vg1 to Vgn.

In the touch display device 110 according to an embodiment of the present disclosure, the rising edge Tr of the fourth to (n−3)th gate voltages Vg4 to Vg(n−3) of the fourth to (n−3)th gate lines GL4 to GL(n−3) overlaps the falling edge Tf of one of the first to (n)th gate voltages Vg1 to Vgn, and the falling edge Tf of the fourth to (n−3)th gate voltages Vg4 to Vg(n−3) of the fourth to (n−3)th gate lines GL4 to GL(n−3) overlaps the rising edge Tr of another of the first to (n)th gate voltages Vg1 to Vgn. As a result, the measured common voltage MVcom of a real voltage of the touch electrode TE has the rising ripple component and the falling ripple component due to a coupling caused by the rising edge Tr of one of the first to (n)th gate voltages Vg1 to Vgn of the first to (n)th gate lines GL1 to GL(n) and the falling edge Tf of another of the first to (n)th gate voltages Vg1 to Vgn of the first to (n)th gate lines GL1 to GL(n). Accordingly, the measured common voltage MVcom of a real voltage of the touch electrode TE is stabilized to the first voltage V1 of the supply common voltage SVcom during one horizontal period (1H) and deterioration such as a bright line is prevented.

As shown in FIG. 3C, in the falling portion FA of the touch electrode TE of the touch display device 110, a falling edge Tf of the (n−2)th to (n)th gate voltages Vg(n−2) to Vgn of the (n−2)th to (n)th gate lines GL(n−2) to GL(n) does not overlap a rising edge Tr and a falling edge Tf of the first to (n−3)th gate voltages Vg1 to Vg(n−3) of the first to (n−3)th gate lines GL1 to GL(n−3).

As a result, in the falling portion FA of the touch electrode TE of the touch display device 110, the common voltage applied to the touch electrode TE during the display period has only a falling ripple component due to a coupling caused by the falling edge Tf of the (n−2)th to (n)th gate voltages Vg(n−2) to Vgn of the (n−2)th to (n)th gate lines GL(n−2) to GL(n).

When a supply common voltage SVcom of a first voltage V1 is supplied to the touch electrode TE during a second compensation period Ps2 delayed from a high level period Ph of the (n)th gate voltage Vgn corresponding to the falling edge Tf of the (n−2)th to (n)th gate voltages Vg(n−2) to Vgn by one horizontal period (1H), a comparison common voltage CVcom of a real voltage of the touch electrode TE has only a falling ripple component due to a coupling caused by the falling edge Tf of the (n−2)th to (n)th gate voltages Vg(n−2) to Vgn. As a result, the comparison common voltage CVcom is not stabilized to the first voltage V1 of the supply common voltage SVcom but assumes a voltage value smaller than the first voltage V1 by a falling deviation ΔVf during one horizontal period (1H). Accordingly, deterioration such as a dark line may occur.

In the touch display device 110 according to an embodiment of the present disclosure, the supply common voltage SVcom of a third voltage V3 higher than a first voltage V1 (V3>V1) is supplied to the touch electrode TE during a second compensation period Ps2 delayed from a high level period Ph of the (n)th gate voltage Vgn corresponding to the falling edge Tf of the (n−2)th to (n)th gate voltages Vg(n−2) to Vgn by one horizontal period (1H). As a result, the measured common voltage MVcom of a real voltage of the touch electrode TE is stabilized to the first voltage V1 of the supply common voltage SVcom during one horizontal period (1H) in spite of a falling ripple component due to a coupling of the falling edge Tf of the (n−2)th to (n)th gate voltages Vg(n−2) to Vgn. Accordingly, deterioration such as a dark line is reduced or prevented.

Here, the third voltage V3 may be a value corresponding to about 60% of a falling peak average of a falling ripple component. For example, the falling peak average may be about −42 mV, and the third voltage V3 may be a value (V1+25 mV) obtained by adding about 25 mV to the first voltage V1. The falling peak average may decrease to about −22 mV (reduction of ripple by about 48%).

The supply common voltage SVcom of the first to third voltages V1 to V3 generated using a multiplexer (MUX) will be illustrated herein below with reference to drawings.

Figure 4:
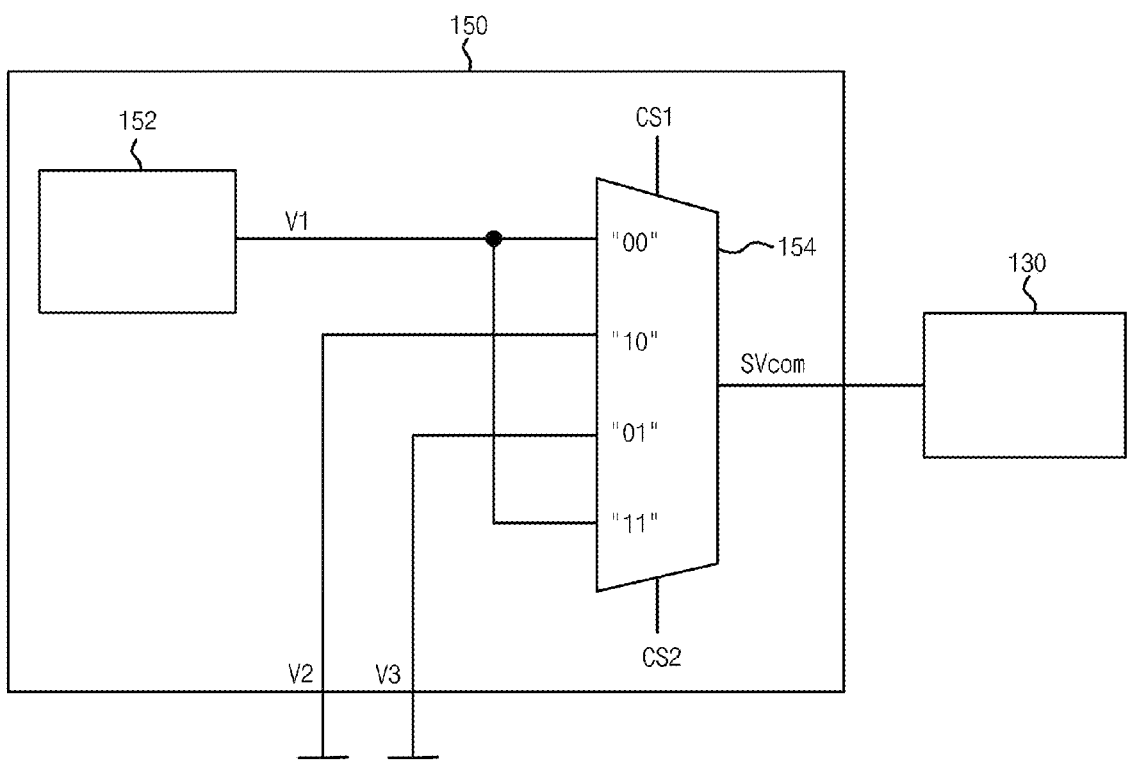
FIG. 4 is a view showing a power supplying part and a touch display driving part of a touch display device according to an embodiment of the present disclosure.
Figure 5:
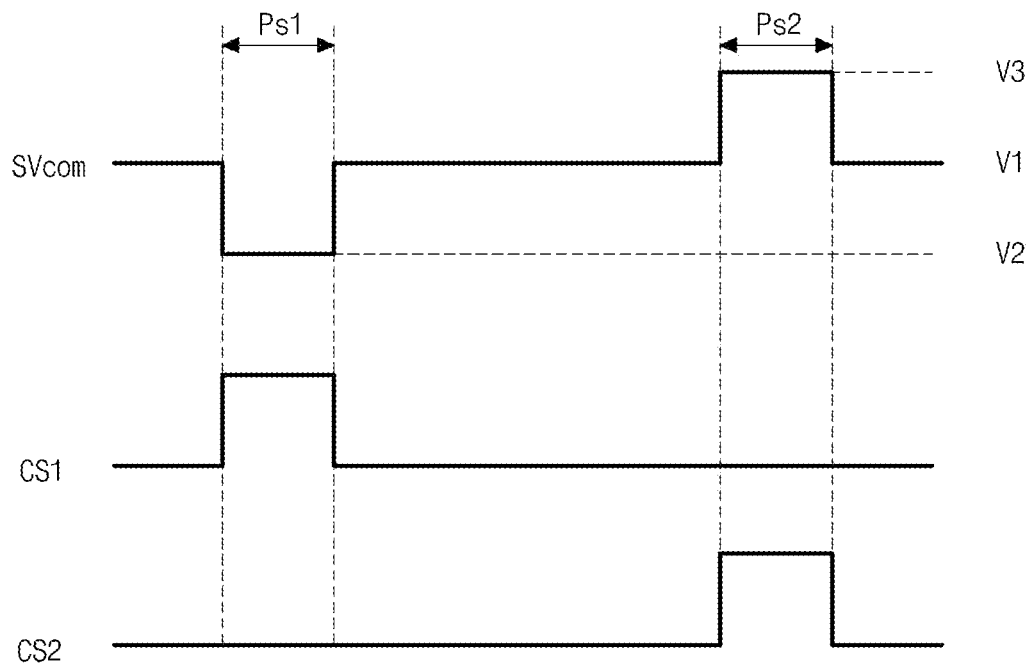
FIG. 5 is a view showing signals of a power supplying part of a touch display device according to an embodiment of the present disclosure.

FIG. 4 is a view showing a power supplying part and a touch display driving part of a touch display device according to an embodiment of the present disclosure, and FIG. 5 is a view showing signals of a power supplying part of a touch display device according to an embodiment of the present disclosure.

In FIGS. 4 and 5, a touch display device 110 according to an embodiment of the present disclosure includes a power supplying part 150. The power supplying part 150 generates a supply common voltage SVcom and transmits the supply common voltage SVcom to the touch display driving part 130.

The power supplying part 150 includes a power managing part 152 and a multiplexer (MUX) 154.

The power managing part 152 transmits a first voltage V1 as a reference common voltage to the MUX 154. For example, the power managing part 152 may have a shape such as a power management integrated circuit (PMIC).

The MUX 154 receives the first voltage V1 from the power managing part 152 and receives a second voltage V2 lower than the first voltage V1 and a third voltage V3 higher than the first voltage V1 from an external power source (not shown).

For example, the first voltage V1 may be adjusted in units of about 10 mV, and the second and third voltages V2 and V3 may be adjusted in units of several mV to several tens of mV, e.g. in units of about 1 mV to about 99 mV.

The MUX 154 outputs one of the first to third voltages V1 to V3 according to first and second compensation signals CS1 and CS2 as a supply common voltage SVcom.

The first compensation signal CS1 has a high level voltage during a first compensation period Ps1 corresponding to a high level period Ph of a first gate voltage Vg1 and has a low level voltage during the other period (in other words, during a remaining period; in still other words, during a period other than the first compensation period Ps1).

The second compensation signal CS2 has a high level voltage during a second compensation period Ps2 corresponding to a high level period Ph of an (n)th gate voltage Vgn delayed by one horizontal period (1H) and has a low level voltage during the other period (in other words, during a remaining period; in still other words, during a period other than the first compensation period Ps2).

When both of the first and second compensation signals have a low level voltage ("00") or a high level voltage ("11"), the MUX 154 outputs the first voltage V1 as the supply common voltage SVcom. When the first and second compensation signals CS1 and CS2 have a high level voltage and a low level voltage ("10"), respectively, the MUX 154 outputs the second voltage V2 as the supply common voltage SVcom. When the first and second compensation signals CS1 and CS2 have a low level voltage and a high level voltage ("01"), respectively, the MUX 154 outputs the third voltage V3 as the supply common voltage SVcom.

The power supplying part 150 of the touch display device 110 according to an embodiment of the present disclosure outputs the second voltage V2 lower than the first voltage V1 as the supply common voltage SVcom during the first compensation period Ps1 corresponding to the high level period Ph of the first gate voltage Vg1 and outputs the third voltage V3 higher than the first voltage V1 as the supply common voltage SVcom during the second compensation period Ps2 corresponding to the high level period Ph of the (n)th gate voltage Vgn delayed by one horizontal period (1H). The power supplying part 150 of the touch display device 110 according to an embodiment of the present disclosure outputs the first voltage V1 as the supply common voltage SVcom during the other period (in other words, during a remaining period; in still other words, during a period other than the first compensation period Ps1 and the second compensations period Ps2).

In the touch display device 110 according to an embodiment of the present disclosure, since the supply common voltage SVcom of the second voltage V2 lower than the first voltage V1 is applied to the touch electrode TE during the first compensation period Ps1 corresponding to the high level period Ph of the first gate voltage Vg1, the rising ripple component due to the coupling of the rising edge Tr of the first to third gate voltages Vg1 to Vg3 is compensated and deterioration such as a bright line is reduced or prevented.

In addition, since the supply common voltage SVcom of the third voltage V3 higher than the first voltage V1 is applied to the touch electrode TE during the second compensation period Ps2 corresponding to the high level period Ph of the (n)th gate voltage Vgn delayed by one horizontal period (1H), the falling ripple component due to the coupling of the falling edge Tf of the (n−2)th to (n)th gate voltages Vg(n−2) to Vgn is compensated and deterioration such as a dark line is reduced or prevented.

Although the gate voltage has a high level period corresponding to three horizontal periods (3H) and the high level period moves by one horizontal period (1H) in an embodiment, the gate voltage may have a high level period corresponding to three or more horizontal periods and the high level period may move by one or more horizontal period in another embodiment. In another embodiment, since the common voltage is modulated to an opposite voltage value during a period where the rising edge and the falling edge of the gate voltage do not overlap the rising edge and the falling edge of the other gate voltage, the ripple due to the coupling of the gate voltage is compensated.

Consequently, in a touch display device according to the present disclosure, since a common voltage is modulated to have different values in synchronization with gate voltages of gate lines overlapping rising and falling portions of a touch electrode, a ripple of a common voltage applied to the touch electrode is compensated and deterioration such as a bright line is reduced or prevented.

Further, since a common voltage decreases during a high level period of a gate voltage of a gate line firstly overlapping a touch electrode and a common voltage increases during a period delayed by one horizontal period as compared with a high level period of a gate voltage of a gate line lastly overlapping a touch electrode, an average of a common voltage is kept constant, deterioration such as a bright line is reduced or prevented, and a display quality is improved.

It will be apparent to those skilled in the art that various modifications and variation can be made in the present disclosure without departing from the spirit or scope of the disclosure. Thus, it is intended that the present disclosure cover the modifications and variations of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
a touch display panel configured to display an image and sense a touch;
a plurality of touch electrodes disposed on the touch display panel and divided into a plurality of blocks;
a plurality of gate lines disposed on the touch display panel and overlapping the plurality of touch electrodes; and
a touch display driving circuit configured to supply a common voltage to the plurality of touch electrodes and supply a gate voltage to the plurality of gate lines,
wherein the common voltage has a first voltage before and after a first compensation period corresponding to a high level period of the gate voltage supplied to one of the plurality of gate lines firstly overlapping one of the plurality of touch electrodes and has a second voltage lower than the first voltage during the first compensation period.

2. The touch display device of claim 1, wherein the common voltage has the first voltage before and after a second compensation period corresponding to a high level period of the gate voltage supplied to one of the plurality of gate lines lastly overlapping one of the plurality of touch electrodes and has a third voltage higher than the first voltage during the second compensation period.

3. The touch display device of claim 2, further comprising a multiplexer configured to:
receive the first to third voltages;
select the first voltage before and after the first compensation period and before and after the second compensation period;
select the second voltage during the first compensation period; and
select the third voltage during the second compensation period.

4. The touch display device of claim 2, wherein the plurality of gate lines include first to (n)th gate lines overlapping one of the plurality of touch electrodes,
wherein the gate voltage includes first to (n)th gate voltages applied to the first to (n)th gate lines, respectively,
wherein each of the first to (n)th gate voltages has a high level period of a high level voltage corresponding to three horizontal periods, and
wherein the high level period of the first to (n)th gate voltages moves by one horizontal period.

5. The touch display device of claim 4, wherein the first compensation period includes the high level period of the first gate voltage.

6. The touch display device of claim 4, wherein the second compensation period includes the high level period of the (n)th gate voltage delayed by one horizontal period.

7. The touch display device of claim 4, wherein a rising edge of the fourth to (n−3)th gate voltage overlaps a falling edge of one of the first to (n)th gate voltages, and wherein a falling edge of the fourth to (n−3) gate voltages overlaps a rising edge of another of the first to (n)th gate voltages.

8. A method of driving a touch display device comprising:
supplying a common voltage to a plurality of touch electrodes of the touch display device;
supplying a gate voltage to a plurality of gate lines of the touch display device; and
displaying an image in a touch display panel of the touch display device using the common voltage and the gate voltage,
wherein supplying the common voltage includes:
supplying a first voltage as the common voltage before and after a first compensation period corresponding to a high level period of the gate voltage supplied to one of the plurality of gate lines firstly overlapping one of the plurality of touch electrodes; and
supplying a second voltage lower than the first voltage as the common voltage during the first compensation period.

9. The method of claim 8, wherein supplying the common voltage further includes:
supplying the first voltage as the common voltage before and after a second compensation period corresponding to a high level period of the gate voltage supplied to one of the plurality of gate lines lastly overlapping one of the plurality of touch electrodes; and
supplying a third voltage higher than the first voltage as the common voltage during the second compensation period.

10. The method of claim 9, wherein the plurality of gate lines include first to (n)th gate lines overlapping one of the plurality of touch electrodes,
wherein the gate voltage includes first to (n)th gate voltages applied to the first to (n)th gate lines, respectively,
wherein each of the first to (n)th gate voltages has a high level period of a high level voltage corresponding to three horizontal periods, and
wherein the high level period of the first to (n)th gate voltages moves by one horizontal period.

11. The method of claim 10, wherein the first compensation period includes the high level period of the first gate voltage.

12. The method of claim 10, wherein the second compensation period includes the high level period of the (n)th gate voltage delayed by one horizontal period.

13. The method of claim 10, wherein a rising edge of the fourth to (n−3)th gate voltage overlaps a falling edge of one of the first to (n)th gate voltages, and wherein a falling edge of the fourth to (n−3) gate voltages overlaps a rising edge of another of the first to (n)th gate voltages.

* * * * *